US012234390B2

(12) United States Patent
Kong et al.

(10) Patent No.: US 12,234,390 B2
(45) Date of Patent: Feb. 25, 2025

(54) DEBONDABLE COMPOSITIONS (71) Applicant: HENKEL AG & CO. KGAA, Duesseldorf (DE)

(72) Inventors: Shengqian Kong, Hillsborough, NJ (US); Yayun Liu, Franklin Park, NJ (US); Wenhua Zhang, Farmington, CT (US); Stephen Hynes, Dublin (IE); John G. Woods, Farmington, CT (US); Jiangbo Ouyang, Wallingford, CT (US); Chunyu Sun, Shanghai (CN); Bahram Issari, Glastonbury, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 15 days.

(21) Appl. No.: 16/000,193

(22) Filed: Jun. 5, 2018

(65) Prior Publication Data
US 2019/0169478 A1 Jun. 6, 2019

Related U.S. Application Data (63) Continuation of application No. PCT/US2016/065713, filed on Dec. 9, 2016.
(Continued)

(51) Int. Cl.
*C09J 183/06* (2006.01)
*B32B 7/12* (2006.01)
(Continued)

(52) U.S. Cl.
CPC ............. *C09J 183/06* (2013.01); *B32B 7/12* (2013.01); *B32B 37/12* (2013.01); *B32B 37/18* (2013.01);
(Continued)

(58) Field of Classification Search
CPC ......... C08L 83/00; C08K 5/0025; C08K 5/14; C09D 183/04; B32B 2310/0831;
(Continued)

(56) References Cited

U.S. PATENT DOCUMENTS 4,585,669 A * 4/1986 Eckberg ............... C08K 5/14
428/452
4,908,086 A 3/1990 Goodrich et al.
(Continued)

FOREIGN PATENT DOCUMENTS

CN 1918256 A 2/2007
CN 1993427 A 7/2007
(Continued)

OTHER PUBLICATIONS

Dahlquist, C. A., Creep. In Satas D., (1999), "Handbook of Pressure Sensitive Adhesive Technology." Warwick, RI.
(Continued)

*Primary Examiner* — Michael B Nelson
(74) *Attorney, Agent, or Firm* — Steven C. Bauman (57) ABSTRACT Dual-cure compositions for use in high temperature adhesive applications, and particularly for temporarily adhesively attaching one substrate to another substrate, are provided. These dual-cure adhesives are silicone-based compositions that can be B-staged by exposure UV radiation to provide initial green strength, followed by a C-stage cure to give adhesives that can survive high temperature processes above 200° C., especially above 300° C., yet easy to debond afterwards to allow separation of the top and bottom substrates.

12 Claims, 4 Drawing Sheets

Related U.S. Application Data (60) Provisional application No. 62/265,188, filed on Dec. 9, 2015.

(51) Int. Cl.

| | | |
|---|---|---|
| *B32B 37/12* | (2006.01) | |
| *B32B 37/18* | (2006.01) | |
| *B32B 43/00* | (2006.01) | |
| *C09J 5/00* | (2006.01) | |
| *C09J 5/06* | (2006.01) | |
| C08G 77/12 | (2006.01) | |
| C08G 77/20 | (2006.01) | |
| C09J 7/35 | (2018.01) | |
| C09J 131/00 | (2006.01) | |

(52) U.S. Cl.
CPC .......... *B32B 43/006* (2013.01); *C09J 5/00* (2013.01); *C09J 5/06* (2013.01); *B32B 2310/0831* (2013.01); *B32B 2457/00* (2013.01); *C08G 77/12* (2013.01); *C08G 77/20* (2013.01); *C09J 7/35* (2018.01); *C09J 131/00* (2013.01); *C09J 2301/40* (2020.08); *C09J 2301/414* (2020.08); *C09J 2301/416* (2020.08); *C09J 2301/502* (2020.08); *C09J 2483/00* (2013.01)

(58) Field of Classification Search
CPC ..... B32B 2457/00; B32B 37/12; B32B 37/18; B32B 43/006; B32B 7/12; C08G 77/12; C08G 77/20; C09J 183/06; C09J 2205/302; C09J 2483/00; C09J 5/00; C09J 5/06; E05B 47/0038; E05B 47/026; E05B 65/46; E05B 65/462
See application file for complete search history.

(56) References Cited

U.S. PATENT DOCUMENTS

| | | |
|---|---|---|
| 5,256,717 A | 10/1993 | Stauffer et al. |
| 5,278,276 A | 1/1994 | Ohta et al. |
| 7,842,755 B2 | 11/2010 | Morita et al. |
| 8,063,143 B2 | 11/2011 | Morita et al. |
| 8,092,628 B2 | 1/2012 | Hong et al. |
| 9,850,409 B2 | 12/2017 | Zhang et al. |
| 2005/0089696 A1* | 4/2005 | Bosshammer .......... C08L 83/04 428/447 |
| 2010/0316845 A1 | 12/2010 | Rule et al. |
| 2011/0318938 A1 | 12/2011 | Takeuchi et al. |
| 2013/0341671 A1* | 12/2013 | Ona .......... H01L 33/56 257/100 |
| 2015/0137172 A1* | 5/2015 | Xing .......... C08G 77/60 257/100 |
| 2016/0068720 A1* | 3/2016 | Zhang .......... C08K 5/5419 156/247 |
| 2017/0233514 A1* | 8/2017 | Yamamoto .......... B32B 7/06 523/435 |

FOREIGN PATENT DOCUMENTS

| | | | |
|---|---|---|---|
| EP | 235294 A1 | | 9/1987 |
| EP | 2639277 A1 | | 9/2013 |
| JP | H04136021 A | | 5/1992 |
| JP | 2010229382 A | | 10/2010 |
| JP | 2012-140060 | * | 12/2012 |
| JP | 2013038098 A | | 2/2013 |
| JP | 2013203794 A | | 10/2013 |
| JP | 2014005324 A | | 1/2014 |
| JP | 5735446 B2 | | 6/2015 |
| JP | 2016529342 A | | 9/2016 |
| JP | 2016210861 A | | 12/2016 |
| TW | 200621891 A | | 7/2006 |
| WO | 0040648 A1 | | 7/2000 |
| WO | WO 2014/019188 | * | 2/2014 |
| WO | 2015000150 A1 | | 1/2015 |
| WO | WO 2015/000150 | * | 1/2015 |
| WO | 2015196345 A1 | | 12/2015 |

OTHER PUBLICATIONS

Itabshi, T. et al. "High temperature resistant bonding solutions enabling thin wafer processing." Published in Electronic Components and Technology Conference (ECTC), 2010 Proceedings 60th, 2010, pp. 1877-1880. Available: https://ieeexplore.ieee.org/document/5490702/.

* cited by examiner

DEBONDABLE COMPOSITIONS

BACKGROUND

Field

Dual-cure compositions for use in high temperature adhesive applications, and particularly for temporarily adhesively attaching one substrate to another substrate, are provided. These dual-cure adhesives are silicone-based compositions that can be B-staged by exposure UV radiation to provide initial green strength, followed by a C-stage cure to give adhesives that can survive high temperature processes above 200° C., especially above 300° C., yet easy to debond afterwards to allow separation of the top and bottom substrates.

Brief Description of Related Technology

Within a number of industries, there is growing interest in the use of flexible and/or very thin substrates in the assembly of goods, particularly consumer goods like personal electronics. For example, stainless steel, silicon wafers, glass, ceramic, polyimide and polyester films are oftentimes used as such substrates. Flexible and very thin substrates are too fragile to be handled freestanding in downstream manufacturing conditions, and must be supported on a suitable carrier to survive. After the fabrication processes are done, the substrate must be removable from the carrier undamaged, preferably at ambient temperature.

In the electronics industry, as one example, imaging displays, sensors, photovoltaics and RFIDs, increasingly require thin and/or flexible substrates for display applications for cell phones, personal digital assistants, iPADs, or TVs. An exemplary substrate is a very thin (100 µm) glass packed with functionalities. The glass is processed at 400° C. to deposit thin film transistors ("TFT") or at 350° C. to deposit indium tin oxide ("ITO") as a transparent conductor. Due to the fragility of the glass and the harsh process conditions, this glass must be reinforced or protected by a more stable substrate during fabrication.

Uses such as this call for a high temperature stable adhesive that is easily and cleanly debondable, that permits temporary bonding at high processing temperatures, and that does not compromise handling or performance of the substrates. The design and development of such adhesives is desirable as it would allow existing fabrication methods, such as for semiconductors, active matrix thin film transistors, touch membranes, or photovoltaics, to use the currently installed base of manufacturing tools and machines. Most currently available temporary adhesives are not thermally stable at the maximum processing of the manufacturing steps, which can be as high as 400° C.

Adhesives suitable for high temperature temporary bonding applications, which can later be removed at room temperature without causing damage to the target component, would advance the use of thinner and/or more flexible substrates across various industries.

Recently, International Patent Publication No. WO 2015/000150 described a debondable adhesive composition comprising (A) the hydrosilation reaction product of the reaction between the vinyl groups on 1,3,5,7-tetravinyl-1,3,5,7-tetramethylcyclotetrasiloxane and the terminal Si—H hydrogens on a silane or siloxane having terminal Si—H hydrogens, (B) a crosslinker for the hydrosilation reaction product, and (C) a metal catalyst and/or radical initiator.

Despite this recent advance in debondable adhesives to which reference is made in the preceding paragraph, in order to improve the throughput of such processes, it would be highly desirable for an adhesive composition to provide quick fixture after exposure to UV irradiation, followed by exposure to elevated temperature conditions to thermally cure the adhesive composition to reach its ultimate cure state.

SUMMARY

The adhesive compositions and processes disclosed herein satisfy that desire.

The inventive composition can be cured upon exposure to radiation in the electromagnetic spectrum from a liquid to a gel or a solid in a B-stage cure. The state transformation forms a pressure sensitive adhesive, achieving a storage modulus $G'>5.0\times10^3$ Pa, desirably $>1.0\times10^4$ Pa, at 25° C. and 1 Hz. These properties provide sufficient adhesive strength. In order to confer upon the inventive composition pressure sensitive adhesive properties, a storage modulus of have $G'$ of less than or equal to $3.0\times10^5$ Pa, at 25° C. and 1 Hz, according to Dahlquist criterion [see Dahlquist, C. A., Creep, in *Handbook of Pressure Sensitive Adhesive Technology*, Satas D. ed., Warwick, R. I. (1999)] for tack is desirable. After a C-stage cure by exposure to elevated temperature conditions, the inventive composition desirably achieves a storage modulus of $G'>1.0\times10^6$ Pa, at 25° C. and 1 Hz. These properties provide the composition with a tack-free surface, thus allowing for ready separation/debonding of substrates attached to one another by the composition.

Broadly speaking, the inventive composition is directed to a composition comprising
  (a) a polysiloxane resin having one or more vinyl groups;
  (b) a (meth)acrylated polysiloxane resin having at least two (meth)acrylate groups; and
  (c) an initiator comprising the combination of a photoinitiator and one of a peroxide and a hydridosiloxane or hydridopolysiloxane.

The inventive composition is curable by two different modalities. The first, exposure to radiation in the electromagnetic spectrum (e.g., UV), and the second, exposure to elevated temperature conditions. These modalities may be used in tandem too.

The inventive composition is useful in various methods. For instance, methods of bonding and debonding with the inventive composition are provided herein.

As regards methods of bonding, a method for bonding a substrate to a carrier is provided. The method includes the steps of:
  (a) providing a substrate and a carrier;
  (b) disposing the inventive composition on the substrate and/or the carrier;
  (c) contacting the substrate and carrier so that the inventive composition is disposed between the carrier and the substrate, forming an assembly;
  (d) curing the inventive composition by
    (i) exposing the assembly to elevated temperature conditions, or
    (ii) exposing the assembly to radiation in the electromagnetic spectrum, or
    (iii) exposing the assembly to radiation in the electromagnetic spectrum followed by to elevated temperature conditions.

As regards methods of debonding, a method for debonding a substrate from a carrier is provided. The method includes the steps of:
(a) providing a substrate adhesively bound to a carrier with the inventive composition; and
(b) separating the substrate from the carrier.

DETAILED DESCRIPTION

As used within this specification and the claims, "substrate" refers to the target component for the fabrication processes, and "carrier" refers to the support structure for the "substrate". A "B-stage" process generally involves partial curing, solvent evaporation, or both, of the adhesives system, oftentimes using UV or heat. This typically allows easy handling of the adhesives, or provides initial adhesives strength as in the case of debondable adhesives described above. When the adhesive system is then heated at elevated temperatures, more complete cross-linking of the adhesive system can occur and a "C-Stage" cure is reached.

The vinyl silicone resins are linear or branched polysiloxane compounds having Si—CH=CH$_2$ groups.

A representative structure for the vinyl silicone resins is shown below:

where $R_1$, $R_2$, $R_3$, and $R_4$ are independently selected from hydrogen, $C_{1-10}$ aliphatic or $C_{6-10}$ aromatic hydrocarbons with or without heteroatoms or unsaturation, and w, x, y, and z are molar fractions of the repeating units (w+x+y+z=1, w>0). Generally, the chain-ends of these resins are terminated by trimethylsilyl group or vinyldimethylsilyl groups. Exemplary vinyl silicones are available from Gelest under VDT product designation.

The (meth)acrylate silicone resins are linear or branched polysiloxane compounds having (meth)acrylate groups either at the backbone or chain-ends.

A representative structure for the (meth)acrylate silicone resins is shown below:

where $R_1$, $R_2$, and $R_3$ are independently selected from hydrogen, $C_{1-10}$ aliphatic or $C_{6-10}$ aromatic hydrocarbons with or without heteroatoms or unsaturation, X is a linking group selected from $C_{1-10}$ aliphatic or $C_{6-10}$ aromatic hydrocarbons with or without heteroatoms or unsaturation, $x_1$, $x_2$, $y_2$, and z are molar fractions of the repeating units (where $x_1+x_2+y_1+y_2+z=1$), and A is either a hydrogen, or (meth) acrylate group. Exemplary (meth)acrylate silicones include products available commercially from Gelest Inc. under the trade designations DMS-R, RMS, and UMS, and TEGO RC silicone resins for release coating available commercially Evonik. More details on each of these is provided in the Examples section. In addition, acrylate silicones are also available from Siltech Corporation under the Silmer ACR product line, such as Silmer ACR D208, Silmer ACR D2, Silmer ACR Di-10, Silmer ACR Di-50, Silmer ACR Di-1508, Silmer ACR Di-2510, Silmer ACR Di-4515-O, and Fluorosil ACR C7-F.

The radical thermal initiators are substances that can produce radical species under heat to initiate radical reactions. Typical thermal initiators are azo compounds, and organic/inorganic peroxides that have weak bonds and small bond dissociation energies.

Suitable radical thermal initiators are well known and may be chosen from dicumene peroxide, cumene hydroperoxide, and perbenzoates, such as t-butyl perbenzoate. Organic peroxides available commercially from Arkema under the Luperox trade name, such as Luperox 531M80 [1,1-di-(t-amylperoxy)-cyclohexane], are particularly useful herein.

The hydridosilane and hydridosiloxane resins are compounds having Si—H group capable of hydrosilation reaction with the double bond on the vinyl silicone resin structure. Exemplary compounds include, but not limited to the following structures:

where $R_1$, $R_2$, $R_3$, and $R_4$ are independently selected from hydrogen, $C_{1-10}$ aliphatic or $C_{6-10}$ aromatic hydrocarbons with or without heteroatoms or unsaturation, and w, x, y, z are molar fractions of the repeating units (w+x+y+z=1, w>0).

The hydridosilane and hydridosiloxane resins may also exist in a cyclic siloxane structure, examples of which are cyclotrisiloxane (D3), cyclopentasiloxane (D5), or even higher.

Hydrosilation catalysts (also called hydrosilylation catalysts) promote the addition of Si—H bonds across unsaturated double bonds. These are typically metal catalysts such as platinum and rhodium compounds.

In another embodiment, this invention is an assembly of a substrate and carrier, in which the adhesive composition is disposed between the substrates.

In a further embodiment, a method of debonding a substrate from a carrier is provided. The method comprises the steps of: (a) providing a substrate and a carrier, (b) disposing a debondable adhesive on the substrate and/or the carrier, (c) contacting the substrate and carrier so that the debondable adhesive is disposed between, forming an assembly, (d) exposing the assembly to conditions favorable to adhere the substrate to the carrier, such conditions being heating at an elevated temperature, exposure to radiation in the electromagnetic spectrum, or exposure to radiation in the electromagnetic spectrum followed by heating, and (e) separating the substrate from the carrier.

When step (d) involves heating, the temperature should be in the range of 100° C. to 175° C. for a period of time of 1 to 30 minutes. When step (d) involves radiation exposure, radiation may be generated and applied using a 400 Watt lamp for about 1 to 4 minutes. When a combination of radiation and heat is used to obtain the desired cure, suitable conditions can be determined by one skilled in the art without undue experimentation.

EXAMPLES

Gel Permeation Chromatography was used to determine the molecular weight of the silicone materials. A Waters model 717GPC, equipped with an autosampler and a refractive index detector, was used with polystyrene of various molecular weights as standards (1.1 M-162 Da) and tetrahydrofuran as solvent.

In the tables below, averaged molecular weights (Mn and Mw in Daltons) and (relative to polystyrene standards) and polydispersivity (Mn/Mw) calculations are shown for the various silicone materials.

| Sample | Mn (Da) | Mw (Da) | Polydispersity (Mw/Mn) |
|---|---|---|---|
| VDT-131 | 17646 | 33365 | 1.9 |
| VDT-431 | 15543 | 35534 | 2.3 |
| VDT-731 | 18540 | 40153 | 2.2 |
|  | 599 | 635 | 1.1 |
| VDT-954 | 42613 | 242352 | 5.7 |
|  | 587 | 608 | 1.0 |

The data above is illustrative for the VDT series, vinyl-methylsiloxane-dimethylsiloxane copolymers, trimethylsiloxy terminated, which is represented by the

| Sample | Mn (Da) | Mw (Da) | Polydispersity (Mw/Mn) |
|---|---|---|---|
| DMS-V05 | 1486 | 2323 | 1.6 |
| DMS-V21 | 6047 | 10963 | 1.8 |
| DMS-V25 | 12097 | 26432 | 2.2 |
| DMS-V31 | 15087 | 36028 | 2.4 |
| DMS-V41 | 42938 | 80479 | 1.9 |
| DMS-V51 | 76987 | 162933 | 2.2 |

The data above is illustrative for the DMS series, vinyl terminated polydimethylsiloxanes, which is represented by the

| Sample | Mn (Da) | Mw (Da) | Polydispersity (Mw/Mn) |
|---|---|---|---|
| PDV-0346 | 63671 | 145752 | 2.3 |
|  | 2066 | 2444 | 1.2 |
|  | 498 | 515 | 1.0 |
| PDV-0541 | 25703 | 74421 | 2.9 |
|  | 552 | 573 | 1.0 |
| PDV-1625 | 7363 | 13386 | 1.8 |
|  | 497 | 512 | 1.0 |
| PDV-1641 | 21127 | 102786 | 4.9 |
|  | 496 | 511 | 1.0 |
| TEGO RC-90 | 7524 | 17532 | 2.3 |
| UMS-182 | 7591 | 12286 | 1.6 |

| Sample | Mn (Da) | Mw (Da) | Polydispersity (Mw/Mn) |
|---|---|---|---|
| | 676 | 713 | 1.1 |
| UMS-992 | 1924 | 2183 | 1.1 |
| | 775 | 796 | 1.0 |

The data above is illustrative for the PDV series, diphenylsiloxane-dimethylsiloxane copolymers, which are represented by TEGO RC-902, which is an acrylated silicone having the following CAS No.: 155419-56- and is described by the manufacturer as siloxanes and silicones, di-Me, hydrogen-terminated, reaction product with acrylic acid and 2-ethyl-2[(2-propenyloxy)methyl]-1,3-propanediol; and For the UMS series, (acryloxypropyl)methylsiloxane-dimethylsiloxane copolymers,

UMS-182: 15-20% (acryloxypropyl)methylsiloxane repeating unit

UMS-992: 99-100% (acryloxypropyl)methylsiloxane repeating unit.

Figure 1:
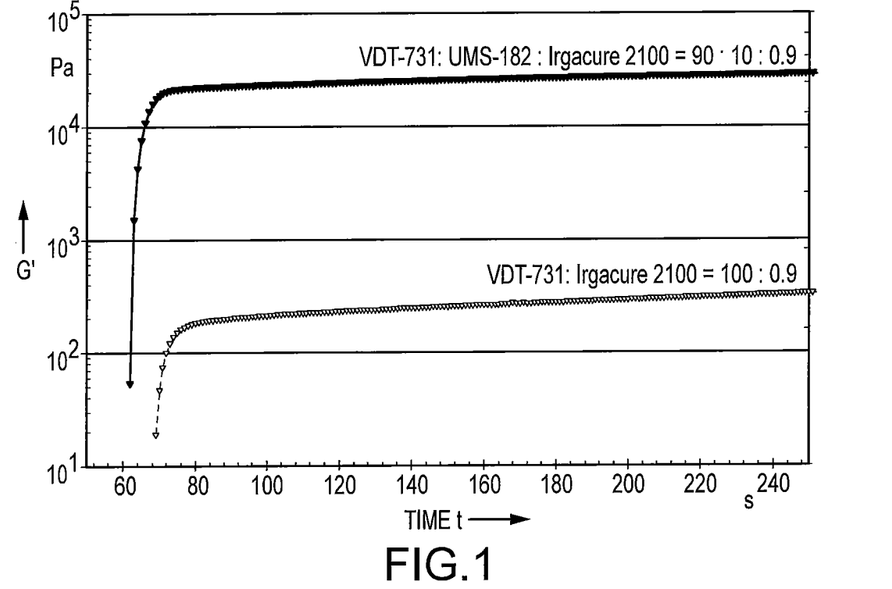
FIG. 1: Storage modulus development of photoinitiated vinylsiloxane (VDT-731)-radical photoinitiator (Irgacure 2100) compositions with and without acrylate-functional silicone (UMS-182).

Example 1: Impact of Acrylated Polysiloxane on UV Cure of Vinyl Silicone Resin A 100:0.9 (by weight) blend of vinyl silicone resin VDT-731 (Gelest) having 7-8% vinyl groups and Irgacure 2100 was cured under 230 mW/cm$^2$ UVA. Curing was monitored with an Anton Paar Physica MCR501 photorheometer using 8 mm plate, 1 mm gap at 1 Hz. UV curing started at 60 seconds. This sample was compared with a 90:10:0.9 blend (by weight) of VDT-731:UMS-182:Irgacure 2100, in which UMS-182 (Gelest) is a silicone resin having 15-20% acrylate groups along the silicone polymer chain. As shown in FIG. 1, the use of small amounts of acrylated silicone resulted in dramatically improved cure speed and roughly two orders of magnitude increase in storage modulus. Considering that the level of acrylate functional group is very low (~2%) among all siloxane repeating units in the composition, the improvement in curing is extremely efficient. Most importantly, the storage modulus exceeded 10$^4$ Pa. It was also noted that the formulation containing UMS-182 gelled at only 1.5 seconds according to Tan Delta, the ratio of loss modulus to storage modulus. Without the acrylated silicone, the gelation process took over 2 minutes.

Irgacure 2100 has the following structure

Figure 2:
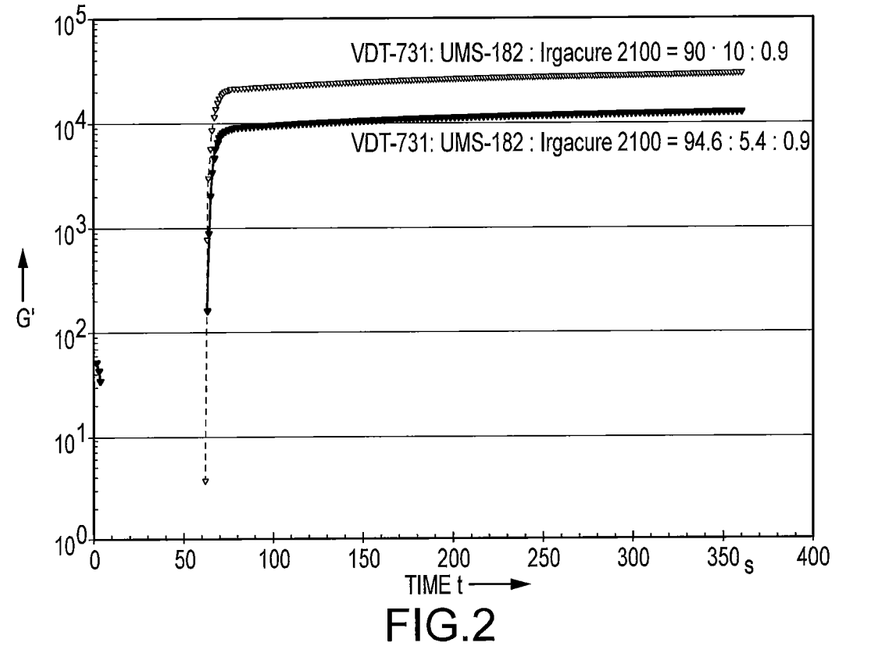
FIG. 2: Storage modulus development of photoinitiated vinylsiloxane (VDT-731)-radical photoinitiator (Irgacure 2100) compositions with different levels of acrylate-functional silicone (UMS-182).

This was repeated with a 94.6:5.4:0.9 blend (by weight) of VDT-731:UMS-182:Irgacure 2100. Again, a very efficient modulus buildup was observed even at extremely low levels of acrylate functionality. (See FIG. 2.)

Example 2: Model Studies of Vinyl Siloxane and Acrylate Monomers

A 90:0 (by weight) blend of SIV9082:butyl acrylate was photopolymerized using 2 weight percent Darocur 1173. The mixture was sealed in a quartz NMR tube and irradiated under ~50 mW/cm$^2$ UVA for 5 minutes. SIV9082 (Gelest) is a vinyl siloxane monomer having the following structure:

Darocur 1173 has the following structure

The SIV9082:butyl acrylate blend has a molar ratio of 4.6:1. This blend helps to promote the co-polymerization reaction between two monomers instead of homopolymerization of the fast acrylate monomer.

$^1$H NMR analyses before and after UV irradiation were conducted. Further, residual monomers were removed from the UV polymerized sample under 400 micron vacuum at 95° C., and $^1$H NMR confirms the formation of polymers incorporating both vinyl siloxane SIV9082 and butyl acrylate monomers.

Example 3: Comparison of Acrylate and Methacrylate Silicones

Figure 3:
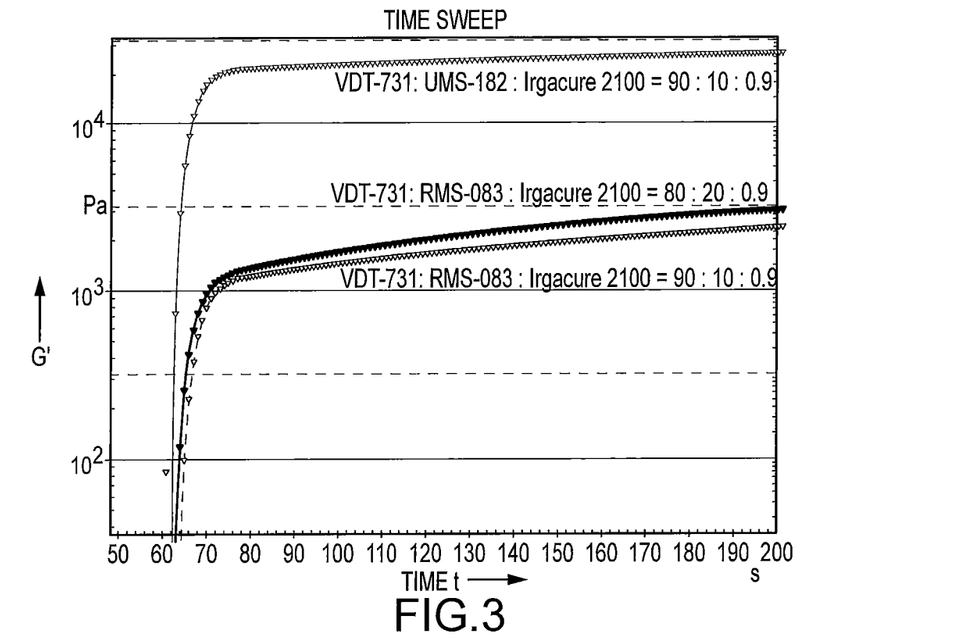
FIG. 3: Storage modulus development of photoinitiated vinylsiloxane (VDT-731)-radical photoinitiator (Irgacure 2100) compositions using acrylate-functional silicone (UMS-182) versus methacrylate-functional silicone (RMS-083).

In this example, methacrylated silicone RMS-083 (Gelest) having 7-9% methacrylate groups in the silicone repeating units was tested. VDT-731:RMS-083:Irgacure 2100 blends at a 90:10:0.9 ratio as well as a 80:20:0.9 ratio were compared with the acrylated silicone formulation made and evaluated above in Example 1. Although slower curing was observed, both samples were eventually cured to $5 \times 10^3$ Pa region. (See FIG. 3.)

Example 4: Use of High Functional Acrylate Silicone

In this example, UMS-992 (Gelest), an acrylate silicone with 99-100% acrylate groups on all siloxane repeating units was tested. A blend of VDT-731:UMS-182:UMS-992:Irgacure 2100 in a 90:10:5:0.9 ratio was cured by photorheometry, and was found to have a storage modulus was ~$10^4$ Pa.

Example 5: Comparison of Different Photoinitiators

Figure 4:
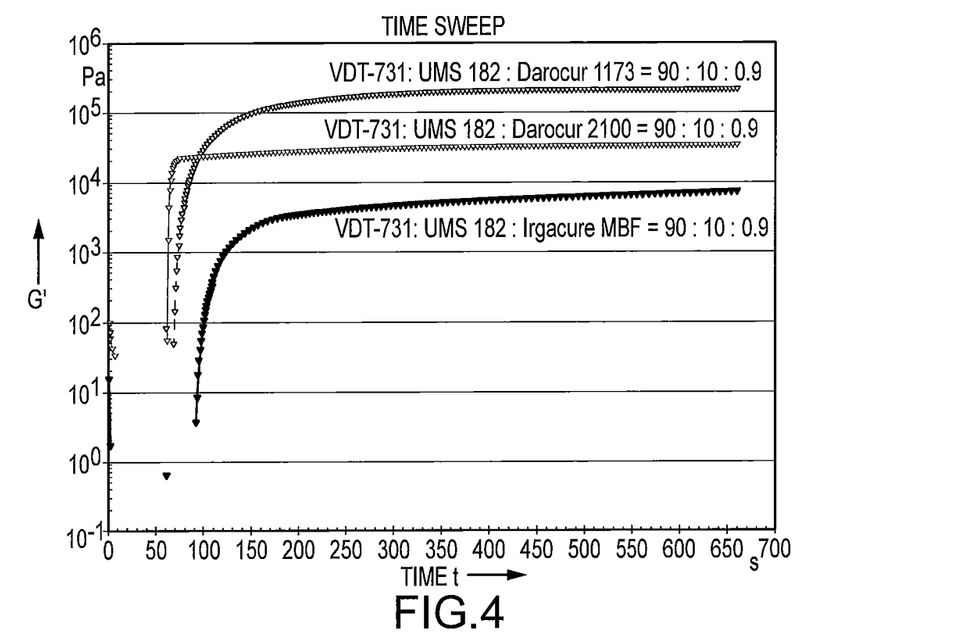
FIG. 4: Storage modulus development of photoinitiated vinylsiloxane (VDT-731)-acrylate-functional silicone (UMS-182) compositions using different radical photoinitiators.

In this example, a resin blend of VDT-731:UMS-182:photoinitiator was prepared at a 90:10:0.9 ratio. Three different types of photoinitiators were evaluated: Irgacure 2100, Darocur 1173, and Irgacure MBF. Irgacure 2100 is an acylphosphine oxide type initiator, Darocur 1173 is alpha-hydroxyl ketone type initiator, and Irgacure MBF is phenylglyoxylate initiator. Irgacure MBF has the structure shown below:

When cured using photorheometry, all three yielded a cured product having a storage modulus exceeding $5 \times 10^3$ Pa after cure. However, Irgacure 2100 was found to be the fastest photoinitiator. (See FIG. 4.) On the other hand, Darocur 1173 resulted in higher storage modulus after cure.

Further, TEGO Al 8 (Evonik) was tested as a less volatile replacement for Darocur 1173 and similar performance was observed. Structures of this initiator is shown below where R is an alkyl group having C10-13 alkyl chains:

Example 6: Thermal Cure of VDT 731

Figure 5:
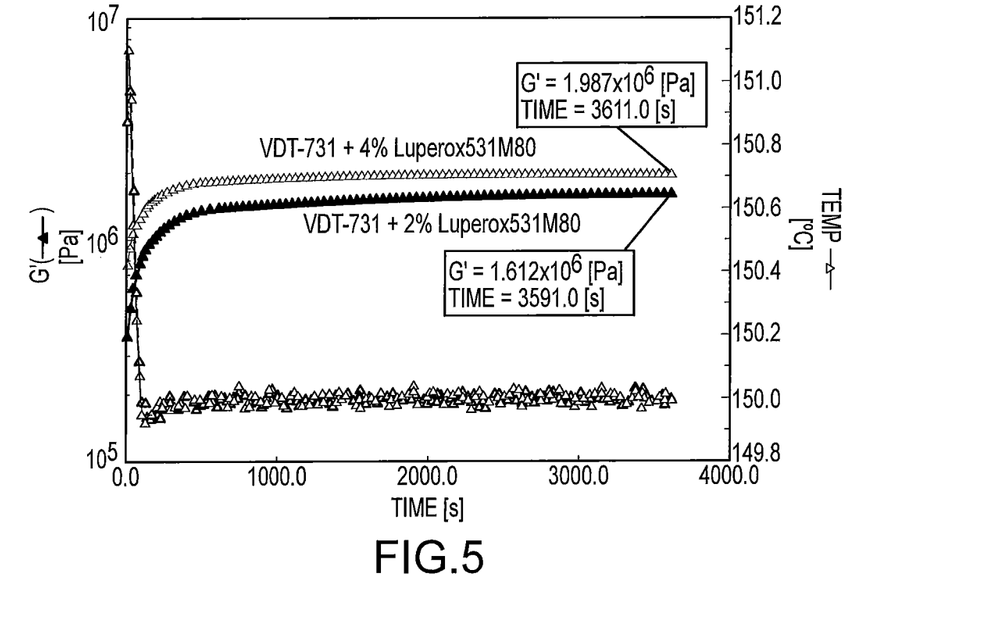
FIG. 5: Storage modulus development of thermally-initiated vinylsiloxane (VDT-731)-radical photoinitiator (Irgacure 2100)/peroxide initiator (Luperox 531M80) compositions.

An important attribute of a debondable adhesive is the ability to easily peel off after processing. Generally speaking, adhesives having storage modulus above $10^6$ Pa are beyond the pressure sensitive adhesive region and are tack-free. VDT-731 was blended with 2 and 4 weight percent Luperox 531M80 and cured on a rheometer. The samples were cured by exposure to elevated temperature conditions, which ramped from room temperature to a temperature of 150° C. at 10° C./minute intervals and then held at a temperature of 150° C. for a period of time of 1 hour. As shown in FIG. 5, the cured samples resulted in storage modulus exceeding $10^6$ Pa. This example demonstrates that samples based on this chemistry are suitable for thermally induced C stage cure.

Example 7: Dual-Cure Formulation

VDT-731 (9.0 g), UMS-182 (1.0 g), Irgacure 2100 (0.1 g), and Luperox 531M80 (0.2 g) were mixed together, and dispensed onto a glass die (4 mm$^2$) over which a microscope glass slide was positioned. Radiation in the electromagnetic spectrum (50 mw/cm$^2$ UVA) was directed toward the glass die/glass slide assembly for a period of time of 30 seconds. The assembly was then exposed to elevated temperature conditions of 150° C. for a period of time of 60 minutes. Next, the assembly was subjected to 30 minutes of baking either at 350° C. or 400° C. to mimic a TFT/ITO processes. At these two baking conditions, the die adhered to the glass slide. The die however was observed to be easily debonded, using the peel strength evaluation technique described herein.

Figure 6:
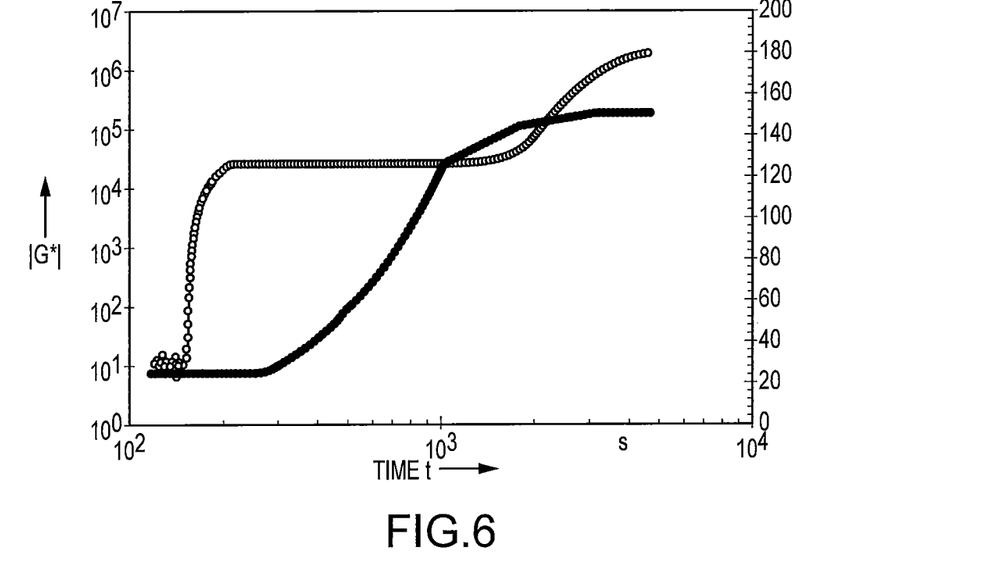
FIG. 6: Storage modulus development of dual cure UV/thermally-initiated vinylsiloxane (VDT-731) acrylate-functional silicone (UMS-182)/-peroxide initiator (Luperox 531M80) compositions.

With reference to FIG. 6, the photorheometry measurements indicate the development of modulus initially after exposure to electromagnetic radiation and then to exposure to elevated temperature conditions.

Example 8: Preparation of Three Master Batches

Master batch A contains 20.0 g VDT-731, 0.20 g Irgacure 2100, and 0.40 g Luperox 231. Master batch B contains 10.0 g UMS-182, 0.10 g Irgacure 2100, and 0.20 g Luperox 231. Master batch C contains 10.0 g Tego RC-902 acrylate silicone resin (Evonik), 0.10 g Irgacure 2100, and 0.20 g Luperox 231. Various blended samples were prepared from these master batches, and are set forth below in Table 1. The blended samples were cured in the photorheometer using the conditions of Example 1 for a period of time of 5 minutes. The G' values for each of the blended samples are also recorded in Table 1.

TABLE 1

| A:B Mixtures | | A:C Mixtures | | Classification according to |
|---|---|---|---|---|
| A:B (wt) | G' (Pa) | A:C (wt) | G' (Pa) | Dahlquist criterion |
| 100:0 | $1.95 \times 10^3$ | — | — | Non-PSA Region |
| 97:3 | $1.32 \times 10^4$ | 97:3 | $1.19 \times 10^4$ | PSA Region |
| 95:5 | $2.10 \times 10^4$ | — | — | PSA Region |
| 90:10 | $4.04 \times 10^4$ | 90:10 | $5.47 \times 10^4$ | PSA Region |
| 85:15 | $5.23 \times 10^4$ | — | — | PSA Region |
| 80:20 | $5.37 \times 10^4$ | 80:20 | $8.03 \times 10^4$ | PSA Region |
| 70:30 | $9.61 \times 10^4$ | — | — | PSA Region |
| 60:40 | | 60:40 | $2.87 \times 10^5$ | PSA Region |
| 50:50 | $1.18 \times 10^5$ | 50:50 | $4.00 \times 10^5$ | PSA Region |
| 40:60 | $4.04 \times 10^5$ | 40:60 | $5.49 \times 10^5$ | PSA Region (borderline) |
| 30:70 | $7.63 \times 10^6$ | — | — | Non-PSA Region |
| 10:90 | $1.12 \times 10^7$ | — | — | Non-PSA Region |
| 0:100 | $1.25 \times 10^7$ | — | — | Non-PSA Region |

From these data, it seems that in order to achieve pressure sensitive adhesive properties for the inventive compositions, a vinyl silicone to acrylate silicone ratio desirably is within the range of 97:3 to 40:60 so that the vinyl functionality to acrylate functionality falls roughly within the range of 21:1 to 0.29:1.

Example 9: Preparation of Three Master Batches

UMS-992, an acrylate silicone resin having 99-100 mole % (acryloxypropyl)methylsiloxane units, was evaluated as a blended with VDT-731 and the initiator package. One drop of each sample was placed between two microscope slides, and exposed to radiation in the electromagnetic spectrum (50 mW/cm$^2$ UVA) for a period of time of 60 seconds. Then the so-formed assembly was exposed to elevated temperature conditions of 150° C. for a period of time of 1 hour. The results are summarized in Table 2.

TABLE 2

| Sample Nos. | Constituents | | | After UV Cure | G' (Pa) | |
| | VDT-731 (part) | UMS-992 (part) | Initiator Package | (50 mw/cm$^2$ UVA), 60 s | After 5 minutes in Photorheometer | After Thermal Cure (150° C./1 h) |
|---|---|---|---|---|---|---|
| 1 | 99 | 1 | IP | Tacky PSA | 1.0 × 10$^4$ | Easy debond CF |
| 2 | 97 | 3 | IP | Tacky PSA | 7.0 × 10$^3$ | Easy debond CF |
| 3 | 95 | 5 | IP | Tacky PSA | 6.0 × 10$^3$ | Easy debond CF |
| 4 | 90 | 10 | IP | Tacky PSA | 4.4 × 10$^3$ | Easy debond CF |
| 5 | 80 | 20 | IP | Not tested, formulation phase separated | 2.8 × 10$^3$ | Not tested |

IP (Initiator Package): 1 part Irgacure 2100 plus 2 parts Luperox 231
CF: cohesive failure during debonding Here, the desired vinyl silicone to acrylate silicone ratio is within the range of 99:1 to 90:10, and the vinyl functionality to acrylate functionality is approximately within the range of 19:1 to 1.4:1.

Example 10: Various Vinyl Silicone Resins

A variety of vinyl silicones having different levels of vinyl group along the polymer chains were formulated. One drop of each sample was placed between two microscope slides, and exposed to radiation in the electromagnetic spectrum (50 mW/cm$^2$ UVA) for a period of time of 60 seconds. Then the so-formed assembly was exposed to elevated temperature conditions of 150° C. for a period of time of 1 hour. The results are summarized in Table 3.

TABLE 3

| Sample Nos. | Constituents | | | After UV Cure | G' (Pa) | |
| | Vinyl Silicone | Acrylate Silicone UMS-182 | Initiator Package | (50 mw/cm$^2$ UVA, 60 s) | After 5 minutes in Photorheometer | After Thermal Cure (150° C./1 h) |
|---|---|---|---|---|---|---|
| 1 | 90 parts VDT-954 (11-13% VMS) | 10 parts | IP | Tacky PSA | 2.1 × 10$^5$ | Easy debond AF |
| 2 | 90 parts VDT-731 (7.0-8.0% VMS) | 10 parts | IP | Tacky PSA | 4.0 × 10$^4$ | Easy debond AF |
| 3 | 90 parts VDT-431 (4.0-5.0% VMS) | 10 parts | IP | Tacky PSA | 5.0 × 10$^3$ | Easy debond CF |
| 4 | 90 parts VDT-131 (0.8-1.2% VMS) | 10 parts | IP | Not cured | 17 | Not tested |

VMS: vinylmethylsiloxane repeating unit
IP: 1 part Irgacure 2100 plus 2 parts Luperox 231
AF: adhesive failure during debonding
CF: cohesive failure during debonding

Example 11: Dual-Cure Formulation Using Hydridosiloxane Thermal Cure

VDT-731 (9.0 g), UMS-182 (1.0 g), Darocur 1173 (0.1 g), HMS-993 (0.6 g), 3,5-dimethyl-hexyn-3-ol (0.05 g), and SIP6830.3 (0.0062 g) were mixed together. HMS-993 (Gelest) is a hydridosiloxane resin having Si—H group in all repeating units (according to the manufacturer, Gelest, it is a polymethyl hydrosiloxane, trimethylsiloxyterminated having a molecular weight of 2100-2400), 3,5-dimethyl-hexyn-3-ol is a hydrosilation inhibitor for potlife stability, SIP6830.3 (Gelest) is a platinum catalyst for catalyzing hydrosilaton cure of the vinyl siloxane resin and hydridosiloxane resin. More specifically, the platinum catalyst may be described as platinum-divinyltetramethyldisiloxane complex or Karstedt catalyst, where a 3-3.5% platinum concentration in vinyl terminated polydimethylsiloxane is present, and the complex is described as $Pt[O(SiMe_2CH=CH_2)_2]_{1.5}$. The samples were cured between a glass die (4 mm$^2$) and a microscope glass slide under exposure to radiation of 50 mW/cm$^2$ UVA for 60 seconds, followed by heating at a temperature of 150° C. for a period of time of 60 minutes. The cured assemblies were then subjected to 30 minutes of baking either at 350° C. or 400° C. At these two baking conditions, the die adhered to the glass slide. The die however was observed to be easily debonded.

Figure 7:
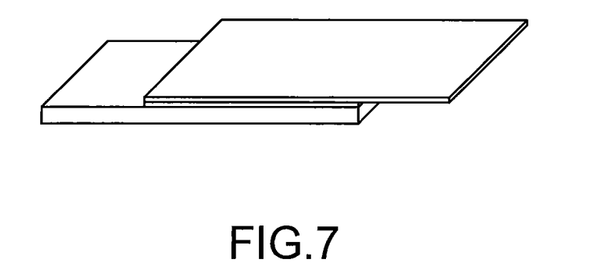
FIG. 7: Depicts a schematic of the peel strength test specimen.
Figure 8:
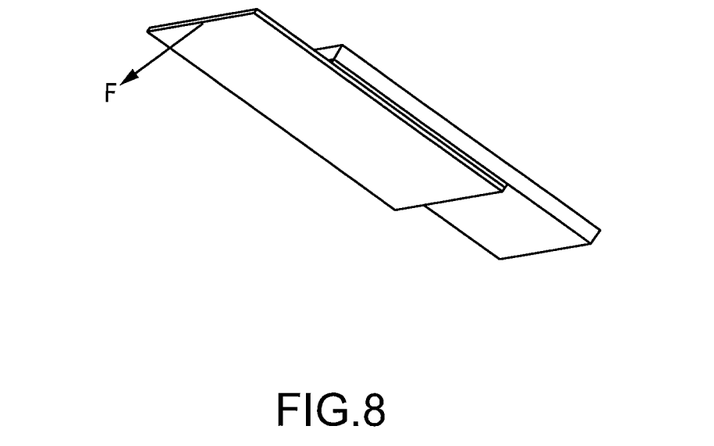
FIG. 8: Depicts a schematic of the peel strength test specimen showing the force F recorded as peel force on a 180 degree peel tester.

The peel test evaluation was conducted on a Cheminstrument 180 degree peel adhesion tester. Peel test samples were prepared by adhering in an off set manner 50 mm×75 mm glass substrate (0.12 mm thickness) on 50×75 mm glass substrate (1 mm thickness) as shown in FIG. 7. The overlap is 50 mm. The glass substrates were adhered by a composition having a thickness control to be 0.125 mm. FIG. 8 shows the force being applied to separate the bonded assembly. An average peel force of over 2N/25 mm is considered not debondable, as substrate failure will ordinarily be observed under such conditions. An average peel force between 1.5-2N/25 mm is considered semi-debondable, and an average peel force of less than 1.5N/25 mm is considered debondable.

Comparative Example 1: Vinyl-Terminated Polydimethylsiloxane

A series of alpha, omega-vinyl terminated linear polydimethylsiloxanes were cured in the presence of 1 weight percent Darocur 1173 under exposure to radiation of 50 mw/cm$^2$ UVA for a period of time of 60 seconds. The results are summarized in Table 4.

TABLE 4

| Base Resin | Viscosity (cSt) | Molecular Weight | Vinyl-Eq/kg | State After UV Cure |
|---|---|---|---|---|
| DMS-V05 | 4-8 | 800 | 2.4-2.9 | Liquid |
| DMS-V21 | 100 | 6000 | 0.33-0.37 | Liquid |
| DMS-V25 | 500 | 17,200 | 0.11-0.13 | Liquid |
| DMS-V31 | 1000 | 28,000 | 0.07-0.10 | Liquid |
| DMS-V41 | 10,000 | 62,700 | 0.03-0.04 | Liquid + sticky gel |
| DMS-V51 | 100,000 | 140,000 | 0.016-0.018 | Sticky Gel |

As shown in the table, only those alpha, omega-vinyl terminated linear polydimethylsiloxanes with molecular weights above 60,000 daltons were found to gel or show the potential to be useful as a pressure sensitive adhesive after cure. DMS-V51 was mixed with 1 weight percent Darocur 1173 and 2 weight percent Luperox 231, and a drop placed between two microscope slides. The slide assembly was exposed to radiation in the electromagnetic spectrum in the UV range (50 mw/cm$^2$ UVA) for a period of time of 60 seconds. Next, the slide assembly was heated at a temperature of 150° C. for a period of time of 1 hour. The cured sample showed good adhesion to the slides but was observed to be hazy and non-uniform. It was difficult to separate the microscope slides by hand and thus not suitable for a debondable adhesive.

Comparative Example 2: Vinyl Terminated Diphenylsiloxane-Dimethylsiloxane Copolymers A series of alpha, omega-vinyl terminated linear diphenylsiloxane-dimethylsiloxane copolymers were mixed with 1 weight percent Irgacure 2100 and 2 weight percent Luperox 231. One drop of each sample was placed between two microscope slides, and exposed to electromagnetic radiation (50 mW/cm$^2$ UVA) for a period of time of 60 seconds, and then heated at a temperature of 150° C. for a period of time of 1 hour. The results are summarized in Table 5.

TABLE 5

| Base Resin | Mole % —SiPh$_2$O— | Viscosity (cSt) | Mol. Wt. | Vinyl-Eq/kg | State After UV Cure | State After Thermal Cure |
|---|---|---|---|---|---|---|
| PDV-0346 | 3.0-3.5 | 60,000 | 78,000 | 0.017-0.021 | Liquid | Cured CF |
| PDV-0541 | 4-6 | 10,000 | 60,000 | 0.027-0.038 | Liquid | Cured AF |
| PDV-1625 | 15-17 | 500 | 9,500 | 0.19-0.23 | Liquid | Not completely cured |
| PDV-1641 | 15-17 | 10,000 | 55,000 | 0.033-0.040 | Liquid | Almost cured CF |

AF: adhesive failure during debonding

CF: cohesive failure during debonding

None of these resins contributed to a composition having pressure sensitive adhesive properties after UV cure. And after thermal cure, all the sample slides were difficult to separate by hand.

Rheology studies were conducted on formulations in Table 5 by ramping from room temperature to 150° C. at 10° C./minutes and then held at 150° C. for a period of time of 1 hour. The final storage modulus is tabulated in Table 6.

TABLE 6

| Base Resin | Final Modulus After 150° C./1 h (Pa) |
| --- | --- |
| VDT-731 in Example 6 | $1.61 \times 10^6$ |
| PDV-0346 | $4.0 \times 10^4$ |
| PDV-0541 | $1.1 \times 10^5$ |
| PDV-1625 | $3.6 \times 10^4$ |
| PDV-1641 | $1.6 \times 10^4$ |

What is claimed:

1. A composition radiation curable to form a pressure sensitive adhesive, comprising:
at least one photoinitiator selected from an acyl phosphine oxide photoinitiator, an alpha-hydroxyl ketone photoinitiator and a phenylglyoxalate photoinitiator; and
a mixture of polysiloxane resins including:
a polysiloxane resin (a) having a vinylsiloxane unit, a molecular weight (Mw) of 2323 to 242352 and a structure represented by:

a polysiloxane resin (b) having at least two (meth) acrylate groups and a structure selected from at least one of:

wherein the composition is free of hydridosilane and hydridopolysiloxane; and the weight ratio of polysiloxane resin (a) to polysiloxane resin (b) in the composition is within the range of 97:3 to 40:60 and the vinyl functionality to acrylate functionality in the composition is within the range of 21:1 to 0.29:1; or the weight ratio of polysiloxane resin (a) to polysiloxane resin (b) in the composition is within the range of 99:1 to 90:10 and the vinyl functionality to acrylate functionality in the composition is within the range of 19:1 to 1.4:1.

2. The composition of claim 1; wherein the composition further comprises a thermal initiator.

3. The composition of claim 1; wherein the polysiloxane resins therein consist of polysiloxane resin (a) and polysiloxane resin (b).

4. The composition of claim 1; wherein:
   1) the composition further comprises a thermal initiator; and
   2) the polysiloxane resins therein consist of polysiloxane resin (a) and polysiloxane resin (b).

5. The composition of claim 1 wherein exposure in a photorheometer to UVA radiation at 230 mW/cm² for 5 minutes forms a pressure sensitive adhesive having a storage modulus (G') of less than or equal to $3.0 \times 10^5$ Pa, at 25° C. and 1 Hz.

6. The composition of claim 1, wherein the polysiloxane resin (a) has a mole % of vinylmethylsiloxane units in the range of 4.0-13.0%.

7. The composition of claim 1, wherein
   (i) the photoinitiator is a combination of and and further comprising 1,1-di-(t-amylperoxy)-cyclohexane as a thermal initiator, or
   (ii) the photoinitiator is and the composition further comprises 3,5-dimethyl-hexyn-3-ol.

8. The composition of claim 1, wherein the polysiloxane resin (a) has
a mole % of vinylmethylsiloxane units in the range of 1-99%.

9. Cured reaction products of the composition of claim 1.

10. An assembly comprising: a substrate,
a carrier, and the composition of claim 1 disposed between the carrier and the substrate.

11. A method for bonding a substrate to a carrier comprising:
(a) providing a substrate;
(b) providing a carrier;
(c) disposing the composition of claim 1 onto at least one of the substrate or the carrier;
(d) contacting the substrate and carrier so that the composition is disposed between the carrier and the substrate, forming an assembly; and
(e) radically curing the composition by
 (i) exposing the assembly to radiation in the electromagnetic spectrum;
 (ii) exposing the assembly to elevated temperature conditions, or
 (iii) (i) followed by (ii).

12. A method for debonding a substrate from a carrier to which the substrate is adhesively bonded, comprising:
(a) providing an assembly comprising the substrate and the carrier with the composition of claim 1 therebetween; and
(b) separating the substrate from the carrier.

* * * * *